US006941000B2

(12) United States Patent
Wong

(10) Patent No.: US 6,941,000 B2
(45) Date of Patent: Sep. 6, 2005

(54) COMPUTER AUTOMATED PROCESS FOR ANALYZING AND INTERPRETING ENGINEERING DRAWINGS

(75) Inventor: Tin Cheung Wong, Kowloon (HK)

(73) Assignee: VHSoft IP Company Limited, Kowloon (HK)

( * ) Notice: Subject to any disclaimer, the term of this patent is extended or adjusted under 35 U.S.C. 154(b) by 741 days.

(21) Appl. No.: 09/900,976

(22) Filed: Jul. 10, 2001

(65) Prior Publication Data

US 2002/0009223 A1 Jan. 24, 2002

(30) Foreign Application Priority Data

Jul. 13, 2000 (GB) ............................................ 0017125

(51) Int. Cl.[7] .................................................. G06K 9/00
(52) U.S. Cl. ...................................................... 382/113
(58) Field of Search ................................ 382/113, 141, 382/154, 190, 195, 203, 204, 217, 218; 715/502; 706/20, 45, 48, 54, 59, 61; 700/118, 182; 345/418, 419, 619, 629, 636, 653

(56) References Cited

U.S. PATENT DOCUMENTS 4,949,388 A * 8/1990 Bhaskaran .................. 382/159
5,251,268 A * 10/1993 Colley et al. ............... 382/156
6,134,338 A * 10/2000 Solberg et al. ............. 382/113

* cited by examiner

*Primary Examiner*—Andrew W. Johns
*Assistant Examiner*—Shervin Nakhjavan
(74) *Attorney, Agent, or Firm*—Clark & Brody

(57) ABSTRACT

The present invention is a computer automated process for analyzing and interpreting engineering drawings in a digital format. The process is the recognition of symbols and graphics in any type of engineering drawings followed by an analysis of the relationship between the symbols and the graphical elements in the drawing to provide a meaningful interpretation of the drawings. The interpretation of the drawings can be carried out in a variety of ways including quantitative analysis of the drawings and/or three dimensional reconstruction of the drawings.

9 Claims, 6 Drawing Sheets

COMPUTER AUTOMATED PROCESS FOR ANALYZING AND INTERPRETING ENGINEERING DRAWINGS

FIELD OF THE INVENTION

This invention relates to a computer automated processing system for analysing and interpreting engineering drawings in a digital format.

BACKGROUND ART

Many aspects within the construction industry such as structural analysis and production of drawings have been computerized. However quantity surveying work such as measuring the amount of steel reinforcement to be used in reinforced concrete construction, amount of formwork and concrete to be used is still done manually.

Quantity surveying work has to date not been capable of computerization due to the enormous difficulty in reading and interpreting the drawings. The job of the quantity surveyor is a complex one which requires a high degree of skill and experience. Quantity surveyors have to undergo extensive training to acquire the necessary skills.

It is common practice that drawings are drafted using some form of computer aided design format. These drawings are then printed out by quantity surveyors to form an integral part of a tender document for tendering purpose.

In construction projects both developers and contractors spend considerable time and effort to determine the cost of the project. The developer is anxious to ascertain and fix the cost of the project with the contractor and the contractor is anxious to ensure that its tender is realistic, covers all aspects of the construction and that the cost estimate is as accurate as is possible.

In general terms the contractor reviews and analyses the engineering drawings of the project which have been prepared by the developer to determine exactly how much material will be needed to complete the project. At this stage an experienced quantity surveyor has to put in 4 to 5 man months to complete the measurement work of a typical high rise project. Once the total amount of the material has been determined the contractor can then determine the cost per item and hence arrive at the total cost of constructing the project.

The breakdown of materials and costs is set out in a document known as the Bills of Quantity. This document generally runs into several hundred pages. In order to prepare the Bills of Quantity qualified quantity surveyors have to review and analyse all aspects of each and every engineering drawing to evaluate precisely how much material will be required to complete the project as shown in the drawings. The number of drawings which have to be reviewed can number several hundred.

Once the contract has been awarded the developer will usually send its own quantity surveyors to do the measurement all over again to find out whether there are any discrepancies between the measurement records undertaken by the two separate quantity surveying teams. If discrepancies are found the two quantity surveying teams then need to check and rectify the difference as a small percentage of error may mean millions of dollars. The total time spent in measuring and verifying this information may add up to 20 man months and thus is an extremely expensive process.

The analysis of engineering drawings is at present a slow manual process which is very time consuming and very expensive. The task is also very repetitive and tedious and is thus subject to human error.

SUMMARY OF THE INVENTION

The present invention is a computer automated process for, analysing and interpreting engineering drawings in a digital format. In essence the process is the recognition of symbols and graphics in any type of engineering drawings followed by an analysis of the relationship between the symbols and the graphical elements in the drawing to provide a meaningful interpretation of the drawings. The interpretation of the drawings can be carried out in a variety of ways including quantitative analysis of the drawings and/or 3 dimensional reconstruction of the drawings.

The recognition of symbols and graphical elements is not new. However to date the recognition of symbols and graphical elements in drawings has been limited to merely static recognition of these items and to date it has not been possible to analyse the relationship between the symbols and the graphical elements to provide meaningful results.

The process requires a computer which has a central processing unit which is operatively coupled to a storage means, a memory means, an input means and an output means. The storage means can be used to store templates of the various different symbols which will be encountered in the drawings and the predetermined algorithms to identify and recognise the graphical elements in the drawings. The storage means can also be used to store any other data or information that will be required in the analysis and interpretation of the drawings.

The analysis of the drawings is carried out in accordance with a set of predefined algorithms which require the central processing unit to, analyse and interpret the symbols, graphical and textual data, which is in digital format, from the drawing and process that information to determine the relationship between the symbols, graphical elements and textual data.

The process can be used for analysing and interpreting any type of engineering drawings, however it is particularly suited for use in the construction industry where a user has to deal with numerous complex drawings. Therefore for the sake of convenience and ease of understanding the process is described hereinbelow by reference to construction engineering drawings.

BRIEF DESCRIPTION OF THE DRAWINGS

Reference is now made to the drawings accompanying the invention, wherein.

DESCRIPTION OF THE PREFERRED EMBODIMENTS

Figure 1:
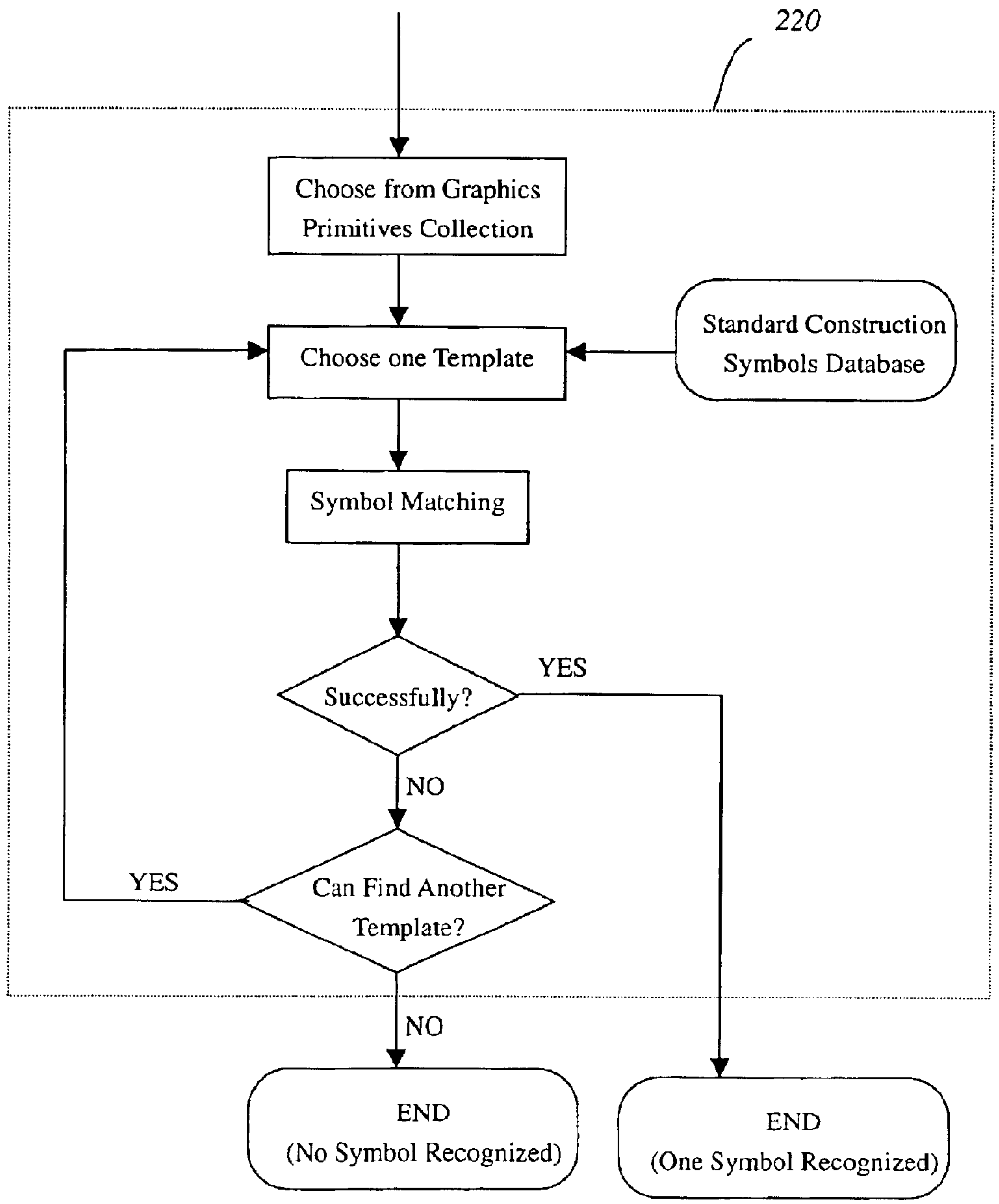
FIG. 1 is a flowchart showing the recognition of symbols.

In analysing construction engineering drawings one has to extract information from two main sources namely framing plans and detailed drawings. The framing plan shows the overall layout of the building on a floor by floor basis while the detailed drawings show the individual structural elements of the building such as columns, walls, beams, slabs and staircases on a floor by floor basis.

The topological information of the elements can be extracted from the framing plan drawings while the actual quantity and size of each structural element can be extracted from the corresponding detailed drawing.

All elements within each drawing are labelled in accordance with an industry standard convention such that a quantity surveyor can identify exactly what each item is composed of. Thus for example with a column plan the quantity surveyor will be able to ascertain the exact number of reinforcement bars in the column, the size of each bar, the degree of overlap of the bars between two adjacent columns. The quantity surveyor has to determine the quantity of material required by interpreting the drawings.

One framing plan drawing gives a plan view of one floor in the building. The drawing consists of lines, arcs, text etc to show or imply the information of the components' position, size and relationship between them.

There are 5 primary types of components in the framing plan and detail drawings. Some of these components are show in the front view in outline format, while others are shown in plan view and some are shown in tables. The 5 types of components are:

1. Columns—these are shown in plan view as closed circular, rectangular or polygonal.
2. Beam—boundaries are represented by two sets of separate parallel lines. Arched beams are represented by concentric arcs.
3. Walls—a set of lines which form a closed polygon represent the base of the wall and 2 sets of lines in which most of the lines are vertical represent the left or the right verge of the wall and 2 sets of parallel lines represent the top of the wall.
4. Staircase—in plan view is shown as one or more group of parallel short lines between every two of which there is the same distance. The shape can be a rectangle or irregular polygon but its boundaries are always walls. In section view each of the steps is composed of 2 connected lines in which one is horizontal and one is vertical. Each landing is composed of 2 parallel lines.
5. Slab—region surrounded by beam and walls and each has a name shown as a string and a slab mark which indicates the position and direction of the slab.

The process can be summarised as follows:

(i) The central processing unit reads all graphic primitives in the drawing, such as lines, text, arc's, dashed lines and this information is stored in various arrays for further analysis. The spatial location of the drawing within the entire plan is also ascertained, such as if the drawing is of a column, the central processing unit will ascertain the floor on which the column is located and the location of the column on that particular floor.

(ii) The central processing unit then recognises the engineering symbols found in the drawing by comparing the symbols in the drawings with templates stored in a storage means. Recognition of the symbols facilitates the recognition of the graphical elements in the drawings;

(iii) The central processing unit then recognises the graphical elements such as columns, beams, walls, slabs and staircases shown in the drawing by means of a predefined algorithm and determines the size and shape of each element.

(iv) The central processing unit then uses the values of each graphical element to enable a 3 dimensional model of the drawing to be created and/or to quantify each of the elements in accordance with a mathematical formula. Thus for example it is possible to quantify the amount of reinforcement steel, the volume of concrete and/or the amount of formwork that will be required in the construction.

Each stage of the process will now be described.

Reading of Graphic Primitives

At the start of the process the central processing unit reads all graphic primitives such as lines, text etc and records and stores these values. In addition to recording and storing the value of each graphic primitive the central processing unit records the spatial location of each graphic primitive in each and every drawing.

Symbol Recognition

In order to recognise the elements in the drawings it is necessary to firstly recognise the symbols, such as slab marks which identify those elements.

Each symbol has one template which can be described in 4 aspects;

1. Entities of which the symbol consists;
2. Conditions that each entity must satisfy;
3. Relationship among the different entities;
4. Thresholds that describe the relationship.

The templates are stored in the storage means and are accessed by the central processing unit as required.

The process of recognising the symbols is illustrated in the flowchart shown in FIG. 1.

The values of all graphic primitives which are held in the various arrays are then subjected to symbol recognition analysis. Symbol recognition requires the central processing unit to compare the value of each graphic primitive in each array with the values of known symbols held in the storage means. If the values of graphic primitives is the same as or within predefined limits of the known values held in the storage means the primitive is recognised as being the appropriate symbol.

Once the symbols in the drawing have been recognised then it is possible to recognise all of the components in the drawing.

Recognition of the various components is carried out sequentially for the sake of efficiency. The sequence is to first recognise the grid system so as to have a reference as to the position and size of the components within the drawings. This is followed by recognition of the columns as these are located at the intersection of two perpendicular grid lines. This is followed by recognition of the beams as these stand on columns. The next component to be recognised are the walls followed by the staircase and slabs.

Column Recognition

Each column in a drawing is identified by a name. In order to identify the column the central processing unit analyses the drawing by reference to a predetermined algorithm.

The algorithm used to identify a column can be described as follows:

1. Identify all grid positions and calculate all the intersections of every two perpendicular grids;
2. Locate column string such as "C1" near every grid intersection. The position of each string is identified and stored in the storage means;
3. If no strings are found then locate string with prefix "C" near the intersection then find all strings with this prefix. The position of each string is then identified and stored in the storage means;
4. Once column is located then try to locate string such as 600*400 near each column string. If found then each size and name is identified and stored in the storage means;

5. If size not found then search entire framing plan to ascertain whether there is a typical column legend which is identified with title string "TYPICAL COLUMN". From this legend it is possible to identify the shape and size of all columns in that particular drawing. This information is then stored in the storage means.
6. If no typical column information found then assume that there is only regular shaped column.
7. If no size information is present then search for closed boundary of column. Size of column cannot be more than half the distance between two adjacent grids.

Beam Recognition

Beams are located on two columns or a column and a wall or another beam. In order to identify the beams the central processing unit analyses the drawing by reference to a predetermined algorithm. The algorithm to identify the beam can be described as follows:

1. Locate beam names by identifying strings such as "*B*". The character "B" should not be located at the end of the string. This information is then stored in a storage means;
2. In respect of each beam string identify string such as 400*500 to identify the width and depth of the beam. Beams can be horizontal or vertical. If the beam is vertical then the beam string must also be vertical.
3. Locate the boundary of each beam identified above. Locate position of each neighbouring element i.e. column or wall. Beam must be between the two components. Identify line between the two elements and hence identify one beam boundary;
4. If size information exists then use this to identify the second beam boundary. If no size information exists then distance of second beam boundary must be up to a predetermined threshold value and must also be between two elements. The second beam line which is underneath the first beam line can be interlaced or overlapped but it cannot be a broken line.

Wall Recognition

The recognition of walls is similar to the recognition of beams and is carried out in accordance with the following algorithm.

1. From all the digital data in the drawing locate wall names by identifying strings "W*" i.e. strings containing the character "W" at the first position. This information is then stored in a storage means;
2. In respect of each wall so identified locate number string such as "200" which denotes the depth of the wall. This information is stored in the storage means;
3. Locate the boundary of each wall identified above using the same procedure as for identifying beam boundary.

Staircase Recognition

In detailed drawings staircases are plan view and section view. Two different types of algorithms must therefore be used to identify the different views of staircases. For plan view the following algorithm is used.

1. Locate staircase string in the plan drawing such as "Staircase No 1";
2. Locate one or more line sets which contain more than 4 lines in one set of similar length and similar distance between the two adjacent lines;
3. Locate closed boundary which encompasses the line set and is at a tangent to the line set.

For the section view of the staircase the following algorithm can be used:

1. Locate a vertical and a horizontal line where one point of the horizontal line is connected with the top point of the vertical line. The ratio of the horizontal to vertical line must be not less than 0.5 and not more than 2. If such lines exist then locate whether there are more than 5 groups of lines similar to them. Such a group represents a step.
2. Locate all steps and locate the top and bottom landing of each such staircase.

Slab Recognition

Slabs are recognised not by any graphical elements in the drawings but by the surrounding components.

The algorithm to recognise slabs is as follows:

1. Locate and recognise holes by locating a set of lines in which there are always two lines which look like "X". Locate vertex of all lines in set. If one closed boundary is found it is assumed it is a hole.
2. Locate and recognise slab marks by comparing symbols found in the drawing with symbols stored in the storage means.
3. Determine boundaries of all walls and beams using procedures outlined earlier and determine centre line of each element;
4. Recognise boundary of each slab by identifying slab marks. Slab marks are located at the centre of each slab. From slab mark find first non horizontal line to the left of the slab mark. From this line find lines connected to this line in counterclockwise manner.
5. Connect holes to slabs by identifying which hole is within which slabs boundary.

Figure 2:
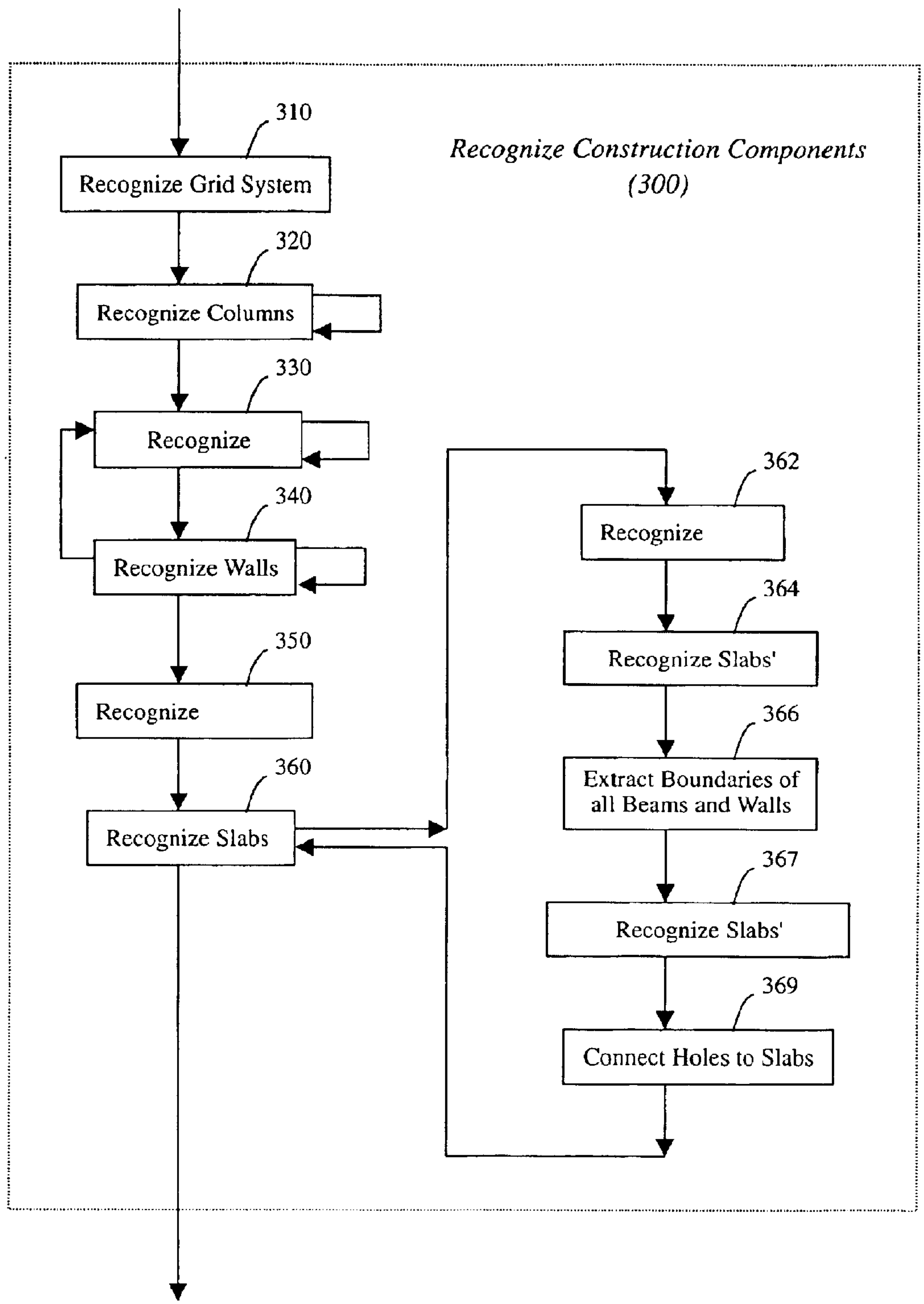
FIG. 2 is a flowchart showing the recognition of components.

The recognition of the components is shown for illustration purposes in the flowchart illustrated as FIG. 2.

Once the elements have been recognised then all data regarding the location of the elements, their size and dimension will be know. With this information it is then possible to interpret the data to create a 3 dimensional model of the graphical elements in the drawings and hence the building as a whole. This is carried out by the central processing unit using a predetermined mathematical formula to combine the data of all the graphic primitives including their spatial location to build up a 3 dimensional picture of the building or elements represented in the drawings. With the 3 dimensional model it is possible to identify any problems that may arise in the construction of the building prior to construction such as the incorrect placement of any element.

From the information obtained as a result of the above process it is also possible to quantify the amount of reinforcement steel, concrete, formwork and other elements that will be required in the construction. In addition it is possible to locate and quantify all other elements such as sprinklers, doors, windows etc which are found in the drawings.

The volume of concrete which will be needed in respect of each element can be calculated by means of a mathematical formula from the dimension of all the various elements.

Similarly the amount of formwork that will be needed in the construction of the various elements can be determined from the dimension of the relevant elements.

The quantification of the reinforcement steel is more difficult than the quantification of the volume of concrete or the amount of formwork as it is necessary to recognise which lines in the drawings represent reinforcement steel bars.

Reinforcement steel usually has three components namely annotation string, polyline and connection line.

The annotation string of a steel bar indicates the steel type, diameter, amount, serial number and location of the reinforcement steel. A polyline represents the shape of the steel reinforcement and the connection line is used to connect the annotation string with the polyline. Thus for example the legend 5-Y10-23-150 B1 means that there are 5 Y type steel bars of 10 mm diameter, spaced at 150 mm apart at B1 (i.e. bottom 1) and all the steel bars have a bar mark 23.

By way of further example the legend 35 R 10-101-150 SS represents single stirrups which are tied around the beam. The number 35 represents the number of stirrups around the beam. The letter R indicates the type of stirrup. The number 10 represents the diameter of the steel bar of the stirrup. The number 101 is the mark of the steel stirrup and the number 150 is the spacing of the stirrups along the beam.

Figure 3:
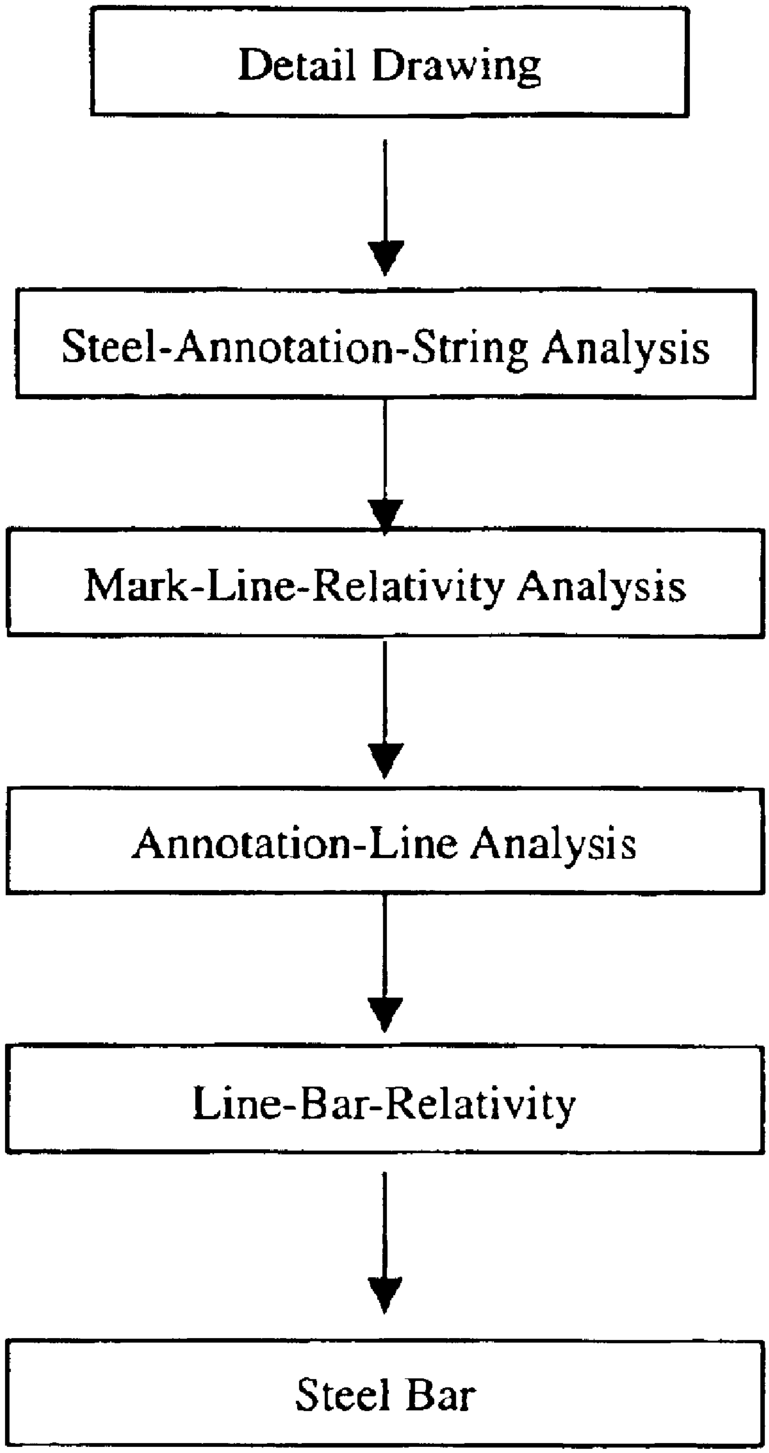
FIG. 3 is a flowchart showing the recognition of reinforcement steel bars.

The recognition of reinforcement steel bars can be show in the flowchart illustrated in FIG. 3.

It can be seen from this illustration that recognition and identification of reinforcement steel bars is carried out on detail drawings by identifying and analysing the steel annotation string, then locating and analysing the annotation line.

Steel Annotation String Analysis

A steel annotation string has 5 main elements namely amount, type, diameter, number and location attribute. The amount indicates the amount of reinforcement steel. The type indicates the type of reinforcement steel such as "T" or "R" or "Y" or "ET". The diameter value refers to the diameter of the steel bars and is represented by an integer ranging in value from 10 to 40. The number value is the serial number of the reinforcement steel and is represented by an integer or an integer plus a character. The location attribute gives the location of the reinforcement steel and can be represented by a string or a sentence such as "T1 & B1", "E.F", "T2" "B2".

The procedure (algorithm) for interpreting the steel annotation string is as follows:

1. From the digital data identify a steel annotation string;
2. This string is then broken down into its individual symbols. For example "5Y10-200 T&B" can be separated into "5, Y, 1, 0, –2,0,0,, T, &,B";
3. Group the separated characters in the string into the correct character group. Thus for example "5Y10-200 T&B" is grouped as "5", "Y", "10", "–", "200, "T", "&", "B".
4. The central processing unit then compares the first three groups with known characteristics of steel type. These predefined characteristics are stored in the storage means;
5. If the steel type group is located in the string then it is used as a reference point and groups before and after this reference point are analysed by the central processing unit to see if they match the predefined characteristics of the components in the steel annotation string. If so the string is determined to be a steel bar annotation string.

Having located the steel bar annotation string an assessment must then be made as to which line in the drawing the annotation string refers so as to identify the steel bar line. The annotation string indicates the steel bar line by the means of an annotation line.

This is done by means of mark line relativity analysis, which measures the closeness between an annotation string and annotation line. Each line is given a notional gravity field. This notional gravity field is not the same as a normal gravity field as the latter cannot represent the correct relationship between drawing objects. Accordingly the gravity field is modified to by the addition of symbols on the line and the collocation of the string and the line.

Symbols that affect the gravity field of a line include short lines, dots and arrows on the line. These factors change the size, shape area and orientation of the gravity field. Points are introduced in the gravity field to shape the gravity of a line. The position of sample points in a gravity field are illustrated in FIG. 4.

Figure 4:
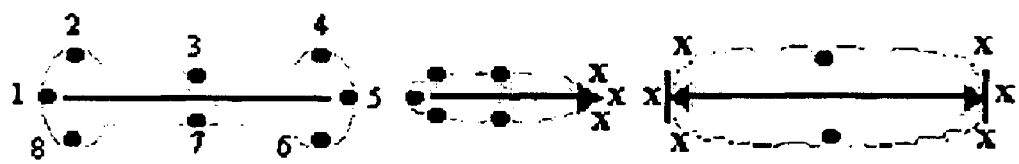
FIG. 4 shows the position of sample points in a gravity field.

The first illustration in FIG. 4 is that of a normal gravity field where all eight points in the field are taken into account in determining the relationship between the line and the string. The second illustration shows a line with an arrow at one end of the annotation line. In this situation the text that connects this line is usually near the opposite end of the line from the arrow. Accordingly the gravity field of the arrow end is minimised and points 4, 5, 6 are not used in the relationship decision. Similarly if the line has arrows at both ends only points 3, 7 are used in the relationship decision.

Collocation of string and line also change the gravity field of a line. Where there are a number of steel bar lines in parallel with each other it can be difficult to identify which steel line the annotation string belongs to.

Figure 5:
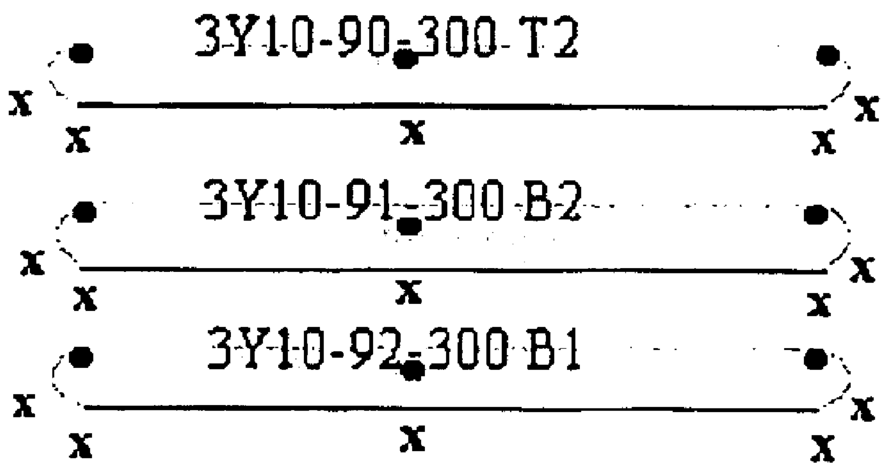
FIG. 5 shows three bar strings and three annotation strings next to each other.

This is illustrated in FIG. 5 where there are three steel bar lines and three annotation string all drawn parallel to each other. In such case it can be difficult to decide which line the string say 3Y10-91-300 B2 refers.

In such case where a group of lines and text are arranged regularly and alternately then the gravity field in the group will be changed so that certain points are disregarded as shown in FIG. 5. Thus in FIG. 5 only sample points 2, 3, 4 will be used in determining the relationship between the line and the string.

Having identified the correct annotation line i.e. the line which connects to the annotation string, a determination is then made as to the steel bar line which is referred to by the annotation line.

The annotation line analysis is carried out in accordance with a predefined algorithm which is stored in the storage means. The algorithm can be described as follows:

1. Locate a line from the drawing;
2. Determine whether there are symbols, such as short line, dot or arrow which intersect with the line;
3. According to the symbols which intersect with the line a gravity field is generated around the line;
4. The central processing unit then determines whether there exists a group of lines and text arranged alternately near the line and whether the lines in the group have the same angle, orientation and length with the line. If a group of lines and text is found then the gravity field of the line is changed according to the collocation.
5. The central processing unit generates a gravity field for every line in the detailed drawing;
6. The central processing unit then determines the distance between the steel annotation string and each annotation line.

The relationship between the steel annotation string and annotation line can then be determined as the line with the nearest gravity field.

Having determined which annotation line is the correct line an analysis must then be made of the steel bar. Steel bars are indicated in two forms namely intersectional steel bar and arrow point steel bar. The former is a polyline which is intersected with the annotation line and the intersection point is marked with a dot symbol. The intersection point of arrow point steel bar is indicated by an arrow. At the intersection point every steel bar and annotation line must be perpendicular. If the steel bar is an intersectional steel bar then the distance between the intersection point and the centre of the dot must be less than half the diameter of the dot. If the steel bar is an arrow point steel bar then the distance between the intersection point and the arrow head must be less than the distance between the arrow tail.

By carrying out this analysis it is possible to identify the steel bar line. Once the steel bar line has been identified it is then possible to calculate the amount of steel required for the construction of that element.

The process will now be described by reference to the drawings.

Figure 6:
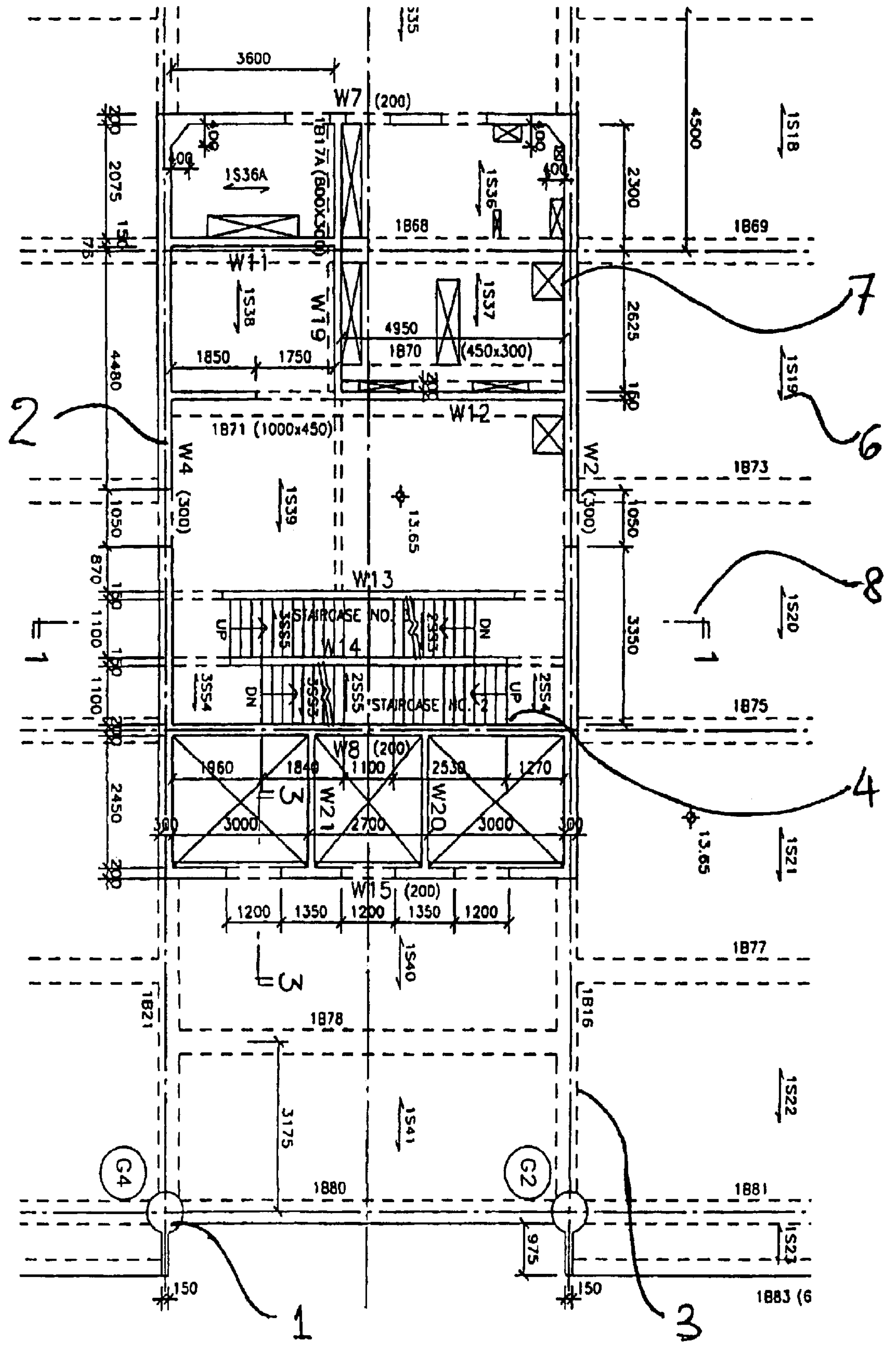
FIG. 6 shows an enlarged section of a framing plan typical framing plan showing various elements.

FIG. 6 shows an enlargement of a portion of a typical framing plan drawing of one floor in a building. Various graphical elements can be seen in the drawing such as column (1), wall (2), beam (3), staircase (4) and slabs (5). The first column in the drawing (1) is identified as G1 with another column identified as G2.

From the FIG. 6 drawing various symbols such as slab marks (6) and selection marks (8) can be seen. In addition a hole (7) i.e. a box marked with an "X" can be seen. Various other holes are also illustrated in FIG. 6 but these have not been marked.

The beam (3) identified in the 1B16 is marked as a dotted line and can be seen between a column G2 on one side and a wall W2 at the other.

It can be seen from FIG. 6 that all graphical elements are represented by lines, dotted lines, arcs, text to show or imply information relating to the position, size and relationship of the different elements.

The process of analysing and interpreting drawings requires the central processing unit to locate all the various graphic primitives . Once all the graphic primitives have been located and their relative position identified each of these primitives is compared with the values of standard symbols stored in the storage means. If the value of the graphical primitive is the same as or within a predefined limit the graphical primitive is recognised as being the appropriate symbol.

Once all symbols have been recognised it is then possible to recognise other graphical elements in the drawings by means of the appropriate algorithm. Thus for example where a slab symbol is recognised the central processing unit can analyse the graphical primitives around the slab mark in accordance with the a predefined algorithm to locate walls and beams as a slab is always surrounded by these two elements.

Similarly when a circle, rectangle or polygon shape is identified the central processing unit can analyse the graphical primitives around the shape in accordance with a predefined algorithm to ascertain whether the shape is a column or not.

Once the graphical elements have been identified the size and shape of the element can then be determined by interpreting the text associated with that element. Thus for example the annotation string (12) identifies the amount, type, diameter, number and location of a particular steel bar.

By using information size and shape each graphical element it is possible to carry out a 3 dimensional reconstruction of the graphical elements.

What is claimed is:

1. A computer automated process for analysing and interpreting engineering drawings in CAD file format wherein a central processing unit which is operatively coupled to a storage means, a memory means, an input means and an output means operating in accordance with a predefined set of instructions analyses drawings and interprets symbols, graphical elements and textual information from the drawing to determine the relationship between the symbols, graphical elements and textual information to provide a quantitative analysis of the graphical elements and to further provide three dimensional reconstruction of the drawings and further provide an interpretation of the data from the drawings in accordance with a predetermined formula and wherein all predefined instructions to operate the central processing unit and all predefined algorithms and instructions and formulae to analyse and interpret the engineering drawings are stored in the storage means.

2. A process as claimed in claim 1 above wherein the central processing unit scans each individual drawing to identify all graphical and textual information and symbols contained within the drawing and to further identify the shape, dimension and the spatial location of each graphical element and the position of all symbols and text in the drawings and wherein such information is stored in the storage means for further analysis.

3. A process as claimed in claim 2 above wherein the central processing unit scans each graphical element in every drawing and compares each graphical element with known patterns stored in the storage means and wherein if the patterns are the same as or within predefined limits as the pattern in the storage means the central processing unit identifies the graphical element and records the position of each graphical element and stores the same in the storage means.

4. A process as claimed in claim 3 above wherein the central processing unit identifies the symbols contained in the drawing by comparing the symbols in the drawings with known patterns stored in the storage means and wherein if the patterns are the same as or within predefined limits as the pattern in the storage means the central processing unit identifies the symbol and the position of the symbol is determined in relation to the surrounding graphical elements.

5. A process as claimed in claim 4 above wherein the central processing unit identifies the text contained in the drawing by comparing the text in the drawings with known patterns stored in the storage means and wherein if the patterns are the same as or within predefined limits as the pattern in the storage means the central processing unit identifies the text and the position of the text is determined in relation to the surrounding graphical elements.

6. A process as claimed in claim 5 above wherein the central processing unit identifies the meaning of each of the graphical elements in the drawings by analysing each graphical element together with any symbols and text associated with the graphical element and the position of the graphical element in accordance with predefined algorithms stored in the storage means.

7. A process as claimed in claim 6 above wherein the central processing unit interprets the relationship between different graphical elements and determines the size shape position and dimension of each graphical element by analysing the textual information and symbols which are connected to or are within predefined limit of proximity to the graphical element and determining the size and dimension of each graphical element in accordance with predefined algorithms stored within the storage means.

8. A process as claimed in claim 7 above wherein the central processing unit locates all information and data relevant to each graphical elements from all relevant drawings in accordance with a predefined set of instructions which is stored in the storage means and wherein such information is stored in the storage means.

9. A process as claimed in claim 8 above wherein the central processing unit determines the quantity and engineering meaning of each graphical element in each drawing in accordance with a predetermined formula stored within the storage means.

* * * * *